T. J. Alexander,
Circular Saw Mill.
Nº 17,861. Patented July 28, 1857.
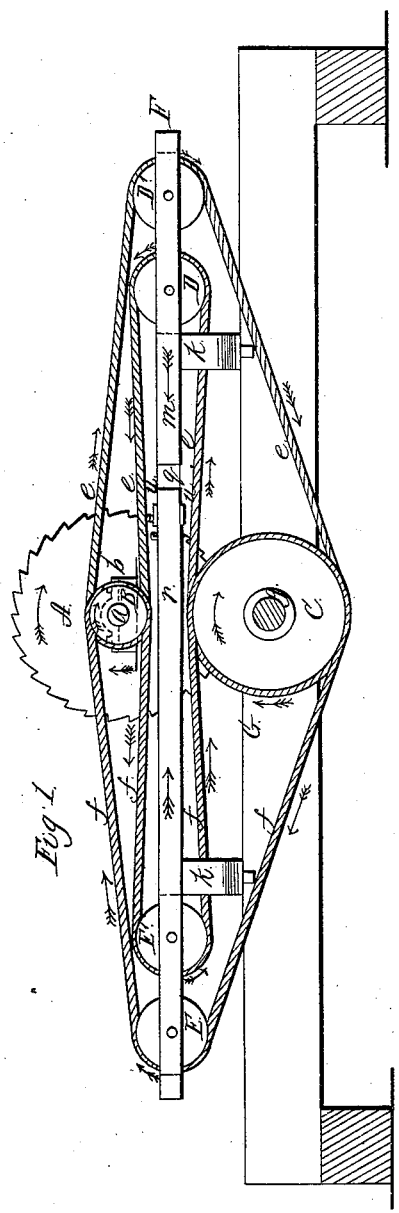
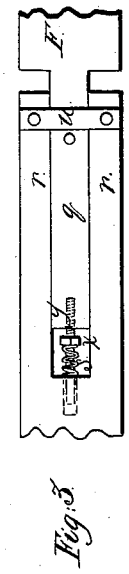
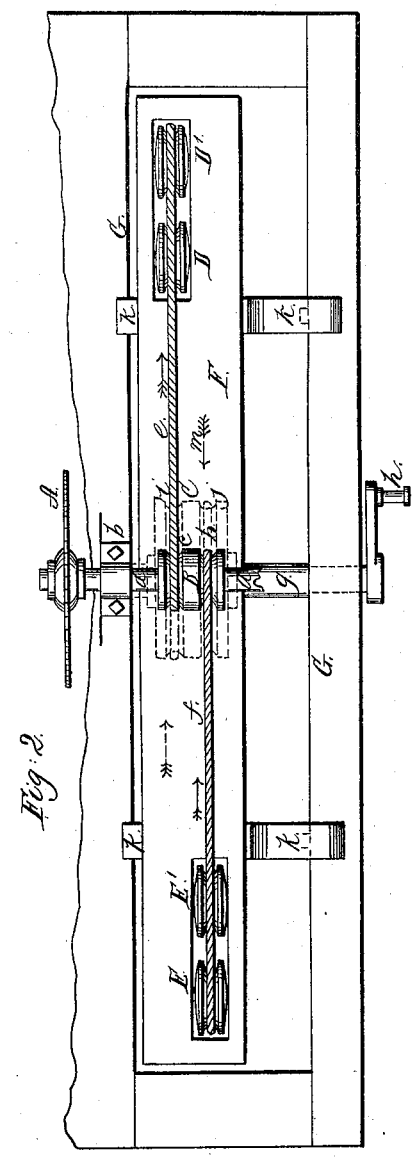

UNITED STATES PATENT OFFICE.

THOS. J. ALEXANDER, OF WESTERVILLE, OHIO.

METHOD OF DRIVING CIRCULAR SAWS.

Specification of Letters Patent No. 17,861, dated July 28, 1857.

*To all whom it may concern:*

Be it known that I, THOMAS J. ALEXANDER, of Westerville, in the county of Franklin and State of Ohio, have invented a certain new and useful Improvement in Driving Arrangements of Revolving Saws or Cutters, of which the following is a full, clear, and exact description, reference being had to the accompanying drawing, which forms part of this specification, and in which—

Figure 1 represents a longitudinal sectional elevation of my improvement applied to the driving of a circular saw; Fig. 2 a partial plan thereof; and Fig. 3 a plan of a detached portion as hereinafter described.

This improvement relates to communicating to revolving saws or cutters their necessary rotary motion or driving action proper, by means of cords, chains, or belts, arranged to pull on the cutter shaft in reverse directions, which thing, of itself, to neutralize or reduce one sided pressure of the cutter or its shaft in its bearings and to obtain a large and advantageous driving lap, is not here claimed as new; but my improvement effects these and other advantages in a novel and more perfect manner than has heretofore been done.

The circular saw (A), represented in the accompanying drawing, (or it may be a revolving groover or other cutter, polisher or grinder, according to the kind of cut or reduction to be made) may either have a fixed relationship, that is simply revolving about its axis, say in fixed bearings; or it may have a compound movement, as, for instance, in addition to its revolving motion it may be made to reciprocate in the path of its cut, instead of feeding up the log or stuff to the saw; or, effecting the feed by the reciprocating travel simultaneously in reverse directions of both log and revolving saw may if preferred, be adopted; both of which plans have their advantages, which it is not necessary here to mention, and which are dependent in a great measure upon the character of the work to be done; but, where a reciprocating travel of the revolving saw is required (and there are numerous advantages attending it and such action is not here claimed as new), my improvement, though, as before observed, applicable to a stationary revolving saw as well, recommends itself with peculiar pertinency and gain, as will be seen from the following description.

The shaft (*a*) of the circular saw (A), turning in one or more suitable bearings or boxes (*b*) stationary or reciprocating as aforesaid, carries a pulley (B) that has two grooves (*c d*) round which are passed in opposite directions, or on opposite sides, two distinct cords or belts (*e f*). The one of these cords (*e*), passing round the saw pulley (B) on its left hand side, and the other cord (*f*) passing round the saw pulley on its right hand side, so as to pull upon the saw shaft (*a*) in opposite directions to conteract one sided pressure of said shaft in its bearings, are operated as follows.

At a little distance from or under the pulley (B) of the saw shaft, I arrange a counter or main driving pulley (C) on a shaft (*g*) that may be made to revolve by a crank (*h*) of a direct acting engine, or by any other means. This counter pulley (C) has two grooves (*i j*) corresponding to the grooves (*c d*) of the saw pulley, to accommodate the run of the belts or cords (*e f*). The grooves however, may be omitted, especially if flat belts be used, and the saw and counter pulleys duplicated or divided and said divisions arranged side by side on their respective shafts, for separate accommodation of the two driving belts or cords (*e f*) but for like action of them as if said pulleys were not duplicated or divided. These driving belts or cords (*e f*) are distinct and endless, and may be described as arranged thus: The one belt (*e*), commencing say, at the top of the counter pulley (C), runs to the right and is passed round a loose, inner, pulley (D), from thence to the left, round the left hand side of the saw pulley (B), back again to the right, round an outer loose pulley (D¹) and from it to the left under and round the left hand side of the counter pulley (C). The other belt (*f*), commencing at the bottom, say, of the counter pulley (C), runs to the left and is passed round an opposite outer loose pulley (E), from thence to the right, round the right hand side of the saw pulley (B), back again to the left, round a second inner loose pulley (E¹), and from it to the right over and round the right hand side of the counter pulley (C). In this way, it will be seen, upon motion being given the counter shaft pulley (C), the two belts (*e f*) are operated, without the "crossing" of either belt (which is always objectionable to the free run of a belt) by the one driving pulley to give a proper motion to both belts for them to drive the saw pulley in one and the same direction; and that, both the saw pulley (B) and counter pulley (C) are encircled and pulled on by the belts on opposite sides, thus relieving both shafts ($a$ and $g$) of one sided pressure or friction, giving more power, elasticity and adhesion, too, than could be obtained from one belt of double the width. Likewise that, by this arrangement, more than the whole circumference of the saw and counter shaft pulleys is encircled by the belts, and a good length, which is always an advantage, of belting is obtained in a compact manner or small space or compass. But this is not all. It is a difficult matter to get two distinct belts thus to act in unison, for belts will vary in stretch, the one as compared with the other, and to materially reduce or prevent friction and heating or uneven wear of the bearings, by making the belts to pull on the shafts ($a$ $g$) in opposite directions, it is necessary that they should pull equally. This, the arrangement I have described enables me to insure, by making the frame (F), which carries the loose pulleys (D $D^1$ and E $E^1$) at opposite ends of it, free to slide or play longitudinally by, say, guiding feet or strips ($k$ $k$) on and along ways (G G); so that by tightening up, say, only the right hand belt ($e$), the loose pulley frame (F), sliding or yielding in direction of the arrow ($m$) indicating the movement of said frame to the left, will strain or stretch on the other belt ($f$), to divide the increased tension between them, whereby, one belt may be riveted and made permanently fast while the other may be laced and tightened from time to time and the labor of tightening confined to the one belt, and the most perfect equality of strain is given the two belts by the self adjusting loose pulley frame (F) at all times.

Of course either belt may be the tightening one. Or, instead of making either belt to tighten, the self adjusting loose pulley frame (F) may be constructed, say at its center, as represented in Figs. 1 and 3 of the drawing, so as to act as a self stretcher as well as an equalizer to the two belts, by dividing said frame and making the one portion of it with a tongue ($q$) arranged to fit freely and loosely for longitudinal play, in a jaw ($r$) made in the other portion of said frame, and inserting a spring ($s$) to press apart, lengthwise, the tongue and jaw portion and so to stretch the two belts and keep them tight, so as to avoid the labor and loss of time in tightening up, from time to time, even the one belt. The tongue ($q$) may work between clamps ($u$, $u$) to guide it and restrain it to no other than longitudinal action, and the spring ($s$) may be made to act against a nut ($x$) screwed on a pin ($y$) firmly inserted in the end of the tongue but having loose or free play in the jaw portion, so that by turning the nut the force of the spring may be increased or diminished and the tension of the belts regulated accordingly.

This novel arrangement of belts and pulleys and self adjusting loose pulley frame (F), when acting in concert, possesses the advantages before named, whether the saw (A) be a stationary revolving one, or have a reciprocating motion in the path of its cut as well, which reciprocating motion or "feed" may be given in various ways, and, as such relates to "feeding" and not to "driving," it is not necessary to describe here how this might be done, but a mode of advantageously accomplishing it, in connection with the means here described, I make the subject of another application. But if the cutter have a reciprocating travel as well as a revolving one, however that reciprocating travel or "feed" be effected, it will be readily seen that the present arrangement affords great facilities for such action, and that the self adjusting loose pulley frame (F) running along with the saw (A), though at a less velocity or to a less distance, and the two belts pulling in opposite directions on the saw shaft, there is no interference with the "driving" or revolving motion of the saw whether reciprocating or pausing in its reciprocating travel for adjustment of cut and so forth.

As equivalents of the loose pulleys (D $D^1$, E $E^1$), fixed blocks or guides, either plain, or carrying a number of small rollers for the belts of the self adjusting frame (F) to run round, might be used, and numerous other modifications adopted without departing from the character of my invention.

What I claim as new and useful in revolving or driving rotary saws or cutters, is—

The combination and arrangement with a revolving saw or cutter, having either a fixed or reciprocating relationship or action in the path of its cut, of the freely sliding or self adjusting loose pulley carrying frame (F) made whole or divided and rigid or self stretching, with its loose pulleys (D $D^1$ E $E^1$), right and left hand belts ($e f$), and pulleys (B, C) of the saw and counter shafts, essentially as specified for operation together in the manner set forth.

In testimony whereof, I have hereunto subscribed my name.

THOS. J. ALEXANDER.

Witnesses:
EZRA MUNSON,
JAMES WESTERVELT.